June 30, 1936.   F. G. CARRINGTON   2,045,753
MANUFACTURE OF CAST METAL PIPES AND LIKE ARTICLES CENTRIFUGALLY
Filed Dec. 13, 1934   2 Sheets-Sheet 2
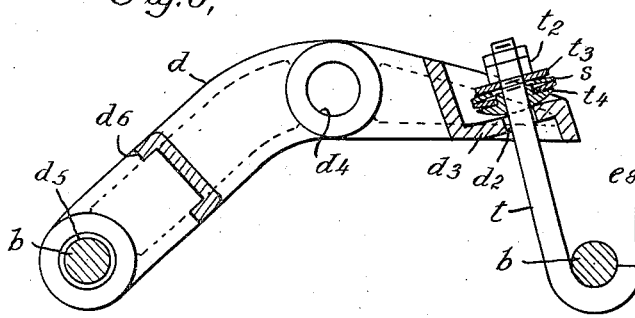
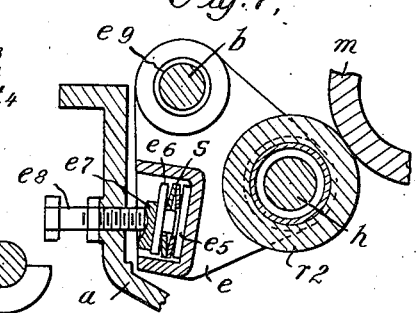
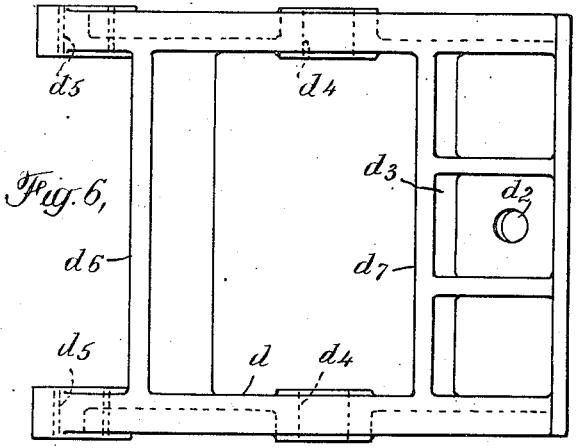
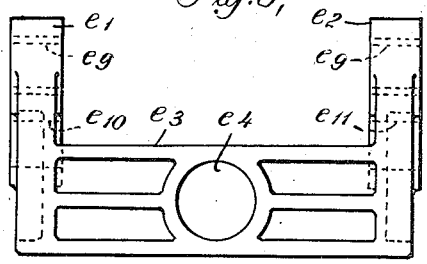
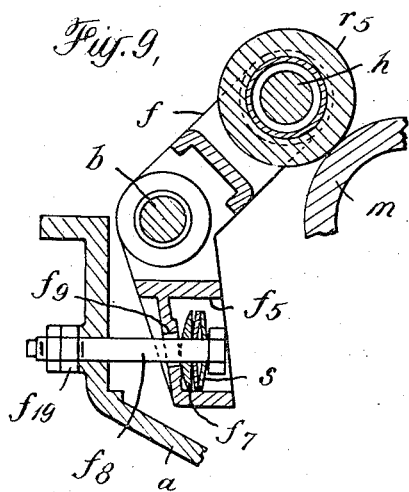
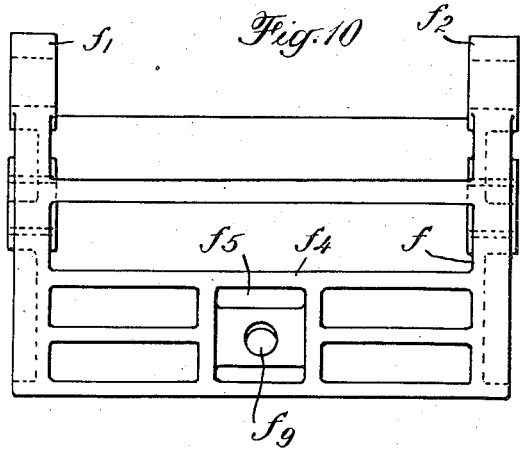
INVENTOR
Frank G. Carrington
BY
Pennie, Davis, Marvin & Edmonds
ATTORNEYS Patented June 30, 1936

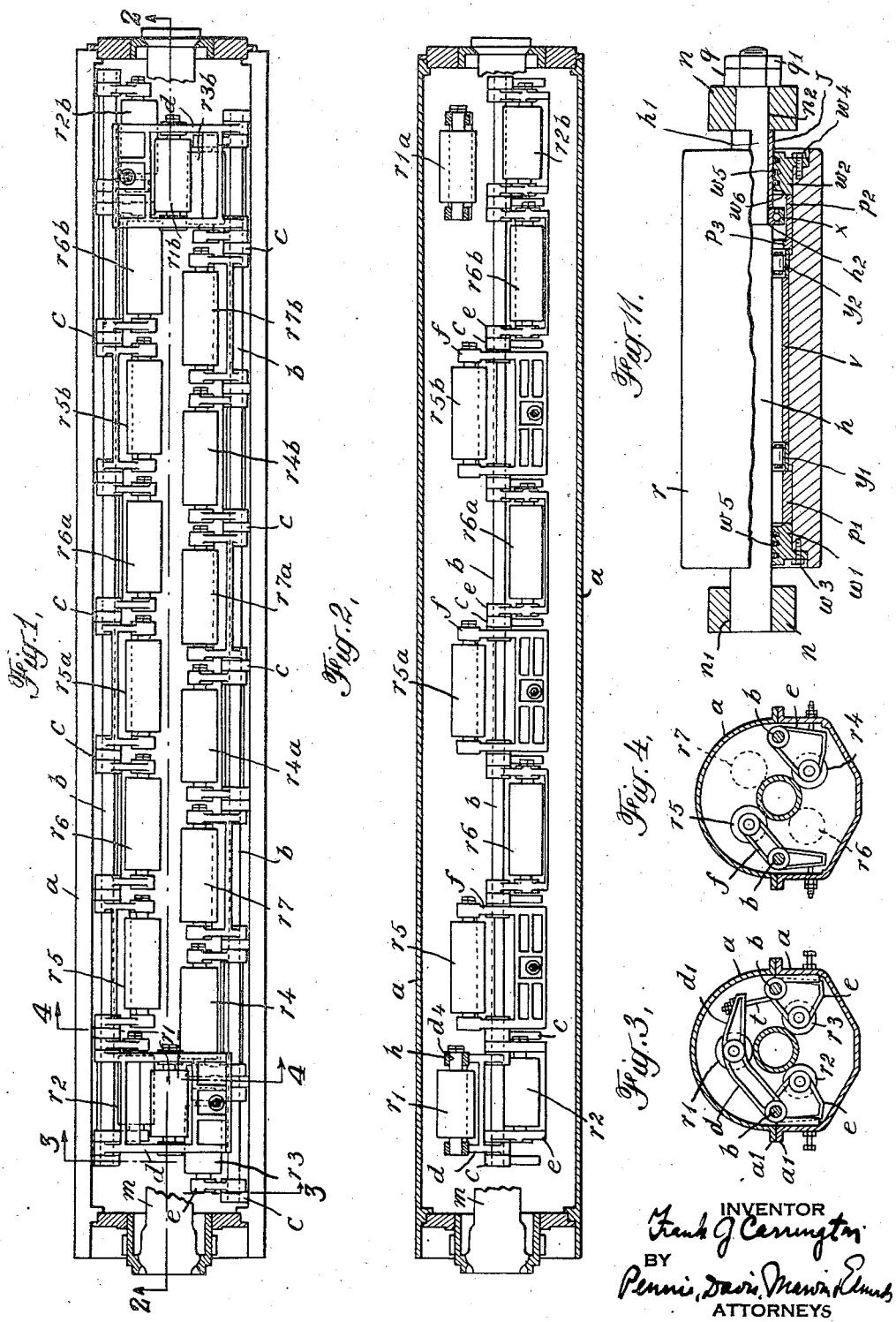

2,045,753

UNITED STATES PATENT OFFICE 2,045,753

MANUFACTURE OF CAST METAL PIPES AND LIKE ARTICLES CENTRIFUGALLY

Frank Gamble Carrington, Anniston, Ala., assignor to Centrifugal Pipe Corporation, Jersey City, N. J., a corporation of Delaware Application December 13, 1934, Serial No. 757,298
In Great Britain December 20, 1933

11 Claims. (Cl. 22—65)

This invention relates to the manufacture of cast pipes and like articles centrifugally.

The manufacture of cast iron pipes centrifugally—that is to say in rotating molds—is now well known and extensively practiced. The present invention comprises an improved mold supporting device in which the molds are supported on rollers, and has for its object to provide for proper contact of the rollers with the mold to give a continuous roller support, notwithstanding the changes taking place as the temperature of the mold rises during the flow of metal into the rotating mold.

The objects of a continuous roller support for a centrifugal mold, are to give a continuous contact between the mold and rollers, to improve cooling conditions, and to offer a resistance to the tendencies of a mold to warp, while allowing it to expand radially and longitudinally while the pipe is being cast. According to the present invention the mold-supporting device comprises a series of rollers which are arranged at intervals about the circumference of the mold throughout its length and which are yieldably supported in position against the mold by springs, while being permitted to rotate freely.

The rollers are preferably arranged in groups each group having the rollers therein differently disposed circumferentially from those in the next group. Each group of rollers may contain a number of rollers spaced circumferentially and the number of rollers in one group may be different from that in another group, and the rollers are preferably mounted upon their shafts to move longitudinally in the direction of and with the molds during expansion and contraction.

A manner of carrying out the invention is illustrated by the accompanying drawings wherein Figure 1 is a partial plan of the apparatus with the top portion removed;

Figure 2 is a sectional elevation along the line 2—2 of Fig. 1;

Figure 3 is a sectional elevation along the line 3—3 of Fig. 1;

Figure 4 a sectional elevation along the line 4—4 of Fig. 1;

Figure 5 is a sectional side view and

Figure 6 a plan of one form of roller carrying bracket;

Figures 7 and 8 are similar views of another form of roller carrying bracket;

Figures 9 and 10 are similar views of a third form of roller carrying bracket, while Figure 11 is an elevation, partly in section, illustrating a form of roller mounting.

In these drawings $m$ is the rotary mold which extends the full length of a supporting structure $a$ and in which is fed, in any suitable manner, a stream of molten metal from end to end during the rotation of the mold. The supporting structure or casing $a$ is made in portions connected together by flanges $a1$ $a1$.

The mold $m$ is supported during rotation by a series of rollers $r1$ to $r7$, $r4a$ to $r7a$, $r4b$ to $r7b$ and $r1b$ to $r3b$. These rollers are arranged in groups for instance $r1$ to $r3$ form one group with the rollers bearing on the mold $m$ at 120° apart, a second group consists of rollers $r4$ to $r7$ with the rollers bearing on the mold $m$ at 90° apart or opposite pairs at 180° apart. These rollers are not wholly in the same transverse plane but are arranged to overlap at the ends so that there is no transverse plane along the mold which is entirely unsupported.

The rollers $r$ are mounted on brackets $d$, $e$ and $f$ pivoted on bars $b$ supported parallel to the axis of the mold $m$ on bearings $c$ which are secured to the casing $a$, and such construction is preferably arranged within a waterbox.

Each of the rollers is held by its pivoted bracket $d$, $e$, or $f$ in a position against the outer surface of the mold, and resists outward movement by means of a spring $s$. The strength of the springs is such as to resist both the tendency for the mold to warp and for it to dilate. The stresses which cause longitudinal mold warpage are however, so much less than the stresses causing dilation, that the strength of the springs may be made to resist effectively the tendency to warp while permitting dilation.

Each bracket $d$, $e$ and $f$ is pivoted on the rods $b$ and the first of the $d$ brackets carries a roller $r1$ which bears on the upper portion of the mold. Each bracket $d$ has an extension $d1$ which prevents the upward movement of the roller $r1$ by means of a tie bolt $t$ see Figure 3 which is hooked at one end $t1$ to extend under one of the bars $b$. The other end of the bolt $t$ passes through a hole $d2$ in a flange $d3$ in the extension $d1$ of the bracket $d$ and is screwed to receive lock nuts $t2$ and a washer $t3$ between the lock nuts and washer $t2$ $t3$ and a ledge $d3$ on the bracket is provided a spring $s$, here shown as a pair of belville springs arranged between the washer $t3$ and a stud washer $t4$ of which one side has a stud extending into the holes of the belville springs while the side is rounded as shown to give a good bearing surface while allowing relative angular movement of the tie bolt $t$ and the bracket $d$.

The rollers $r1$ have at each end shafts or journals $h$ which are carried in the bores $d4$ in the brackets $d$ and the bars $b$ pass through pivoted bearings $d5$ in the bracket $d$. The brackets $d$ are formed of two side portions connected together by a member $d6$ at one side of the roller bores $d4$, and at the other side of the said bores by a member $d7$ in which is formed the flange $d3$.

Figure 7 is a sectional side view and Figure 8 a front view of another form of roller carrying bracket $e$ for rollers arranged below the axis of the mold $m$. The bracket $e$ is formed of two end members $e1$ and $e2$ connected together by a member $e3$ in which is provided a recess $e4$ for the reception of the spring $s$, here also shown a pair of belville springs arranged between two washers $e5$ and $e6$, the latter having a stud entering the holes in the spring and on its outer side is provided a bearing member $e7$ in which loosely fits the end of an adjusting screw $e8$ whereby the position of a roller say $r2$ can be adjusted relatively to the mold $m$. At the upper portion of each end member $e1$ and $e2$ of the bracket $e$ are provided bearings $e9$ engaging the bar $b$. This bracket $e$ is also provided with bores $e10$ and $e11$ for the reception of the shafts or journals $h$ of the rollers $r2$.

Figures 9 and 10 are similar views of a third form of roller carrying bracket $f$ or rollers arranged above the axis of the mold but bearing to one side or the other of the top portion of the mold $m$. This bracket is formed of two end members $f1$ and $f2$ connected together by members $f3$ and $f4$ the latter being provided with a recess $f5$ for the reception of the spring $s$ here also shown as a pair of belville springs arranged between the head of a bolt $f8$ and a washer $f7$ which has a curved base bearing on the base of the recess $f5$. The bolt $f8$ passes through a hole $f9$ in the base of the recess $f5$ and through the walls of the casing $a$ where it is provided with lock nuts $f19$ for adjusting the position of the roller $r5$ relatively to the mold $m$.

Figure 11 is an elevation, partly in section, of a roller mounting showing the roller $r$ slidably mounted upon the shaft $h$ which is fitted into the bores $n1$ and $n2$ in the bracket $n$. The right end portion $h1$ of the shaft is of smaller diameter than the remaining portion and is surmounted by the ball-bearing member $x$ which abuts against the shoulder $h2$. A shaft sleeve $j$ engages one side of the bearing member $x$ and holds the bearing member $x$ in position against the shoulder $h2$. The shaft portion $h1$ extends beyond the bracket $n$ and is threaded to accommodate a nut $q$ and lock nut $q1$ which holds the shaft non-rotatable in the bracket and the sleeve $j$ in pressed engagement with the ball-bearing member $x$. The roller $r$ is bored to accommodate a spacing sleeve $v$ serving to hold the roller bearing members $y1$ and $y2$ in proper spaced position when the annular members $p1$ and $p2$ are thrust thereagainst by the water-seal members $w1$ and $w2$ bolted to the roller $r$ by tap bolts $w3$ and $w4$. The members $w1$ and $w2$ are provided with conventional shaft water-seal means $w5$ such as felt rings or the like. The annular member $p2$ is recessed to a larger diameter than the ball-bearing member $x$, and the roller $r$ is free to move along the shaft $h$ to the right until the shoulder $p3$ strikes $x$ and to the left until the shoulder $w6$ strikes $x$ on the opposite side. Sufficient clearance is provided between each end of the roller $r$ and the bracket $n$ to allow this motion. The roller $r$ is carried on the shaft $h$ by the roller bearing members $y1$ and $y2$ and since there is relatively low frictional contact at these points and high frictional contact between the roller $r$ and the mold $m$, the roller $r$ will move along its shaft during expansion and contraction of the mold. The ball-bearing member $x$ is designed to absorb thrust loads in the direction of the shaft $h$ and is positioned between the shoulders $p3$ and $w6$ to limit the longitudinal motion of the roller $r$ in each direction with a minimum of frictional opposition to rotation.

Casting machines are made with the mold fastened in a thrust bearing at one end and free to expand at the other. With the ordinary roller supports under the mold, the expanding mold slides over the rollers with very small friction and corresponding thrust. With rollers spaced around the mold, however, the thrust is objectionably large. The co-efficient of friction is much smaller between the roller shell and the shaft than it is between the roller shell and the mold, so by allowing clearances and using roller bearings, the roller floats back and forth with the mold as it expands and contracts and the thrust is the slight resultant friction between rollers and shafts. In case the roller is moved to an extreme position in either direction, the thrust is carried by the shoulder against the ball bearing.

The roller mounting illustrated in Figure 11 may be employed in mounting the rollers shown in Figures 1 or 2 and the bracket $n$ may be similar in construction and form to the brackets $d$, $e$ or $f$.

At the spigot end of the mold the rollers in contact with the mold may be arranged to extend to the spigot ring or end of the water box when the mold is cold, and mounted on the alternate bars at the spigot end, there may be rollers which are slightly larger in width than the increase in mold length, due to expansion. These rollers may be held against the spigot ring by springs, so that during expansion they will follow the spigot ring so that the full length of the mold is always in contact with rollers, regardless of its momentary length. The water box may be provided with lugs spaced to act as supports for each of the rings of the roller supporting structure.

The use of short rollers which are independent of each other, rather than rollers the length of the mold permits a better contact between the rollers and the mold while the pipe is being cast. When a pipe is partially cast a section from the bell would be dilated and cylindrical, then would come a short conical section that would be in the stage of being dilated, and a third section in which the metal had not yet been deposited. A mold of this shape would contact long cylindrical rollers only at a few points, while, by mounting the rollers in short independent sections, each section would adjust itself to the diameter of the mold in that zone.

Better cooling for the molds is obtained with this form of roller support, because molds are more quickly cooled in the roller paths than to either side of them. The remarks about the warping and dilation stresses are based on the assumption, for warpage, that the maximum warpage to be encountered would be, at a maximum, about that now permitted by the clearance between the mold ends and the water box flanges. The effort to straighten a mold, warped to this extent, is then calculated, by the load evenly distributed, required to give a beam, with the dimensions of the mold, a deflection equal to the warpage. Springs are then designed to give a resistance slightly greater than the load represented by the roller length. The dilation stresses are assumed to be those required to dilate the mold to an equal extent by internal pressure, and the magnitude of the dilation on the radii is assumed to be of a proportional magnitude to the longitudinal dilation, which is about ¾ inch for an 18 foot length of a 6 inch mold.

Water seals with felt guards are provided between the mold and the water box for preventing water from entering to the ball bearings.

In normal cases the water boxes remain stationary and the mold rotates but it is conceivable where high speeds of mold rotation are required that the water box may also be rotated so as to diminish the relative rotation of the mold relative to the supporting rollers while actually increasing the speed of mold rotation.

I claim:

1. A device for supporting a centrifugal pipe mold comprising a series of rollers arranged at intervals about the circumference of the mold throughout its cylindrical length, said rollers being yieldably supported against the mold and arranged in groups, each group having the rollers therein differently disposed circumferentially from those in an adjacent group.

2. A mold supporting device in accordance with claim 1 wherein the number of rollers in one group are different from that in another group.

3. A mold supporting device in accordance with claim 1, wherein the ends of the rollers in one group overlap those in the next group.

4. A mold supporting device in accordance with claim 1, wherein the yieldable supports for the rollers are designed to resist any tendency of the mold to warp while allowing it to expand radially while the pipe is being cast.

5. A mold supporting device in accordance with claim 1, wherein the yieldable supports for the rollers are springs of the belville type.

6. A mold supporting device in accordance with claim 1, wherein the rollers are mounted on pivoted brackets of which the pivots are parallel to the axis of the mold wherein the pivots of the brackets are formed as two parallel bars fixed to the casing at or about the height of the centre of the mold on each side of it.

7. A mold supporting device in accordance with claim 1, wherein the rollers are mounted on pivoted brackets of which the pivots are parallel to the axis of the mold wherein the brackets carry the rollers at one side of their pivots and the springs at the other side of them.

8. A mold supporting device in accordance with claim 1, wherein the rollers are mounted on pivoted brackets of which the pivots are parallel to the axis of the mold wherein for some of the rollers arranged above the axis of the mold, the spring is arranged to operate on the bracket at a position further from the pivot than the roller.

9. A mold supporting device in accordance with claim 1, wherein the rollers are arranged in groups each group having the rollers therein differently disposed circumferentially from those in another group wherein some of the rollers are arranged in groups of three at 120° apart and some in diametrically opposite pairs.

10. A device for supporting a centrifugal pipe mold comprising a series of rollers arranged at intervals about the circumference of the mold throughout its cylindrical length, said rollers being yieldably supported in position against the mold and displaceable longitudinally to the extent that the mold expands or contracts.

11. A device for supporting a centrifugal pipe mold comprising a series of rollers arranged at intervals about the circumference of the mold throughout its cylindrical length, said rollers being yieldably supported in position against the mold and mounted upon bearings which offer less frictional resistance to the longitudinal movement of the rollers than the resistance of the rollers to the mold as the mold expands.

FRANK G. CARRINGTON.